US012029926B2

(12) United States Patent
Castiglione et al.

(10) Patent No.: US 12,029,926 B2
(45) Date of Patent: Jul. 9, 2024

(54) RESPIRATORY PROTECTION DEVICE POSITIVE PRESSURE SEAL CHECK METHODS AND DEVICES

(71) Applicant: 3M INNOVATIVE PROPERTIES COMPANY, St. Paul, MN (US)

(72) Inventors: David M. Castiglione, Hudson, WI (US); Thomas R. Braxton, II, Tampa, FL (US)

(73) Assignee: 3M Innovative Properties Company, St. Paul, MN (US)

( * ) Notice: Subject to any disclaimer, the term of this patent is extended or adjusted under 35 U.S.C. 154(b) by 868 days.

(21) Appl. No.: 17/250,119

(22) PCT Filed: Jun. 4, 2019

(86) PCT No.: PCT/IB2019/054637
§ 371 (c)(1),
(2) Date: Dec. 1, 2020

(87) PCT Pub. No.: WO2019/234627
PCT Pub. Date: Dec. 12, 2019

(65) Prior Publication Data

US 2021/0228921 A1 Jul. 29, 2021

Related U.S. Application Data

(60) Provisional application No. 62/681,293, filed on Jun. 6, 2018.

(51) Int. Cl.
*A62B 18/10* (2006.01)
*A41D 13/11* (2006.01)
(Continued)

(52) U.S. Cl.
CPC .......... *A62B 27/00* (2013.01); *A41D 13/1184* (2013.01); *A62B 9/02* (2013.01);
(Continued)

(58) Field of Classification Search
CPC ........... A61B 90/05; A61B 90/40; A62B 7/04; A62B 7/10; A62B 7/12; A62B 9/02;
(Continued)

(56) References Cited

U.S. PATENT DOCUMENTS 4,029,092 A * 6/1977 Morgan ................. A62B 18/02
128/206.29
4,373,520 A * 2/1983 Arbique ................. A62B 18/08
128/201.19

(Continued)

FOREIGN PATENT DOCUMENTS

CA 1 123 705 * 5/1982 ............... A62B 7/00
JP 4732394 7/2011

(Continued)

OTHER PUBLICATIONS

Extended EP Search Report, EP19815706.7, dated Feb. 3, 2022, 8 pages.

(Continued)

*Primary Examiner* — Camtu T Nguyen

(57) ABSTRACT

There is provided a respiratory protection device comprising a mask body defining a breathable air zone for a wearer and having a front cover; an exhale valve in fluid communication with the breathable air zone; and a seal check mechanism disposed in the front cover, where the seal check mechanism comprises a button associated with a flap such that, when actuated, the flap biases the exhale valve in a closed position.

(Continued)

There is provided in some embodiments a plane of the button intersecting with a plane of the exhale valve. There is also provided in some embodiments the button and the plunger being a monolithic part.

19 Claims, 3 Drawing Sheets

(51) Int. Cl.
*A62B 9/02* (2006.01)
*A62B 18/02* (2006.01)
*A62B 27/00* (2006.01)
*A62B 7/12* (2006.01)

(52) U.S. Cl.
CPC .............. *A62B 18/02* (2013.01); *A62B 18/10* (2013.01); *A62B 7/12* (2013.01)

(58) Field of Classification Search
CPC ....... A62B 18/00; A62B 18/02; A62B 18/025; A62B 18/10; A62B 23/02; A62B 27/00; A41D 13/1184
See application file for complete search history.

(56) References Cited

U.S. PATENT DOCUMENTS

| | | | | |
|---|---|---|---|---|
| 5,299,448 | A * | 4/1994 | Maryyanek ............ | A62B 27/00 73/40 |
| 8,443,806 | B2 | 5/2013 | Morelli | |
| 2010/0132714 | A1 | 6/2010 | Morelli | |
| 2013/0298512 | A1 | 11/2013 | Symons | |
| 2014/0216474 | A1 | 8/2014 | Mittelstadt | |
| 2014/0251327 | A1 | 9/2014 | Mittelstadt | |
| 2015/0107596 | A1 | 4/2015 | Mashiko | |

FOREIGN PATENT DOCUMENTS

| | | |
|---|---|---|
| JP | 2016-054828 | 4/2016 |
| WO | WO2015-179156 | 11/2015 |
| WO | WO2017-172361 | 10/2017 |

OTHER PUBLICATIONS

International Search report for PCT International Application No. PCT/IB2019/054637 mailed on Oct. 15, 2019, 3 pages.

* cited by examiner

RESPIRATORY PROTECTION DEVICE POSITIVE PRESSURE SEAL CHECK METHODS AND DEVICES

CROSS REFERENCE TO RELATED APPLICATIONS

This application is a national stage filing under 35 U.S.C. 371 of PCT/IB2019/054637, filed Jun. 4, 2019, which claims the benefit of U.S. Provisional Application No. 62/681,293, filed Jun. 6, 2018, the disclosure of which is incorporated by reference in its/their entirety herein.

TECHNICAL FIELD

This disclosure relates to respiratory protection devices and methods, in particular a respiratory protection device including a seal check mechanism, and a method of performing a positive pressure seal check of a respirator protection device including a seal check mechanism.

BACKGROUND

Respiratory protection devices commonly include a mask body and one or more filter cartridges that are attached to the mask body. The mask body is worn on a person's face, over the nose and mouth, and may include portions that cover the head, neck, or other body parts, in some cases. Clean air is made available to a wearer after passing through filter media disposed in the filter cartridge. In negative pressure respiratory protection devices, air is drawn through a filter cartridge by a negative pressure generated by a wearer during inhalation. Air from the external environment passes through the filter medium and enters an interior space of the mask body where it may be inhaled by the wearer.

In order to effectively deliver breathable air to a wearer, respiratory protection devices desirably provide an adequate seal to prevent unfiltered air from entering the mask. Various techniques have been proposed for testing the integrity of a seal provided by a respiratory protection device. In a positive pressure test, an exhalation valve of the respiratory protection device is blocked while the wearer exhales into the mask. An adequate seal may be signaled by an increased internal pressure due to the inability of air within the mask to escape through an exhalation valve if a leak is not present. Alternatively, negative pressure tests have been proposed in which a filter cartridge port is blocked while a wearer inhales while wearing the mask. An adequate seal may be signaled by a reduced internal pressure due to the inability of air to enter the mask if a leak is not present.

SUMMARY

The present disclosure provides a respiratory protection device, comprising: a mask body defining a breathable air zone for a wearer and having a front cover; an exhale valve in fluid communication with the breathable air zone; and a seal check mechanism disposed in the front cover, where the seal check mechanism comprises a button associated with a flap such that, when actuated, the flap biases the exhale valve in a closed position, and where a plane of the button intersects with a plane of the exhale valve. In some embodiments, the seal check mechanism further comprises a plunger, where the plunger has a connecting member configured to movably connect the plunger to the flap. In some embodiments, the flap is configured to receive the connecting member.

In some embodiments, the button comprises a flexible material configured to bias the seal check mechanism in an open position. In some embodiments, the flexible material comprises an elastomer. In some embodiments, the seal check mechanism further comprises a retainer operably disposed between the button and the flap. In some embodiments, the retainer and exhale valve are pivotably connected.

In some embodiments, the button and the plunger are a monolithic part. In some embodiments, exhalation by a wearer while the seal check mechanism is in a closed position provides an indication of the presence of leaks around a periphery of the mask body. In some embodiments, the indication is the wearer's ability to exhale.

In some embodiments, when the mask body is positioned for use on a wearer, a positive pressure is achieved by closing the exhale valve and exhaling. In some embodiments, the seal check mechanism returns to an open position when the wearer stops actuating the button. In some embodiments, the flap pivots between an open position and a closed position. In some embodiments, components used in the seal check mechanism, other than the button, comprise rigid materials.

The present disclosure also provides a respiratory protection device, comprising: a mask body defining a breathable air zone for a wearer and having a front cover; an exhale valve in fluid communication with the breathable air zone; and a seal check mechanism disposed in the front cover, where the seal check mechanism comprises a button flexibly attached to a flap, and where when the button is actuated, the flap biases the exhale valve in a closed position, and further where the button and the plunger are a monolithic part.

In some embodiments, the seal check mechanism further comprises a plunger, where the plunger has a connecting member configured to movably connect the plunger to the flap. In some embodiments, the flap is configured to receive the connecting member. In some embodiments, the button comprises a flexible material configured to bias the seal check mechanism in an open position. In some embodiments, the flexible material comprises an elastomer.

In some embodiments, the seal check mechanism further comprises a retainer operably disposed between the button and the flap. In some embodiments, the retainer and exhale valve are pivotably connected. In some embodiments, a plane of the exhale valve is different than a plane of the button. In some embodiments, the plane of the exhale valve intersects the plane of the button.

In some embodiment, exhalation by a wearer while the seal check mechanism is in a closed position provides an indication of the presence of leaks around a periphery of the mask body. In some embodiments, wherein the indication is the wearer's ability to exhale. In some embodiments, when the mask body is positioned for use on a wearer, a positive pressure is achieved by closing the exhale valve and exhaling. In some embodiments, the seal check mechanism returns to an open position when the wearer stops actuating the button.

In some embodiments, the flap pivots between an open position and a closed position. In some embodiments, components used in the seal check mechanism other than the button comprise rigid materials.

The above summary is not intended to describe each disclosed embodiment or every implementation. The Figures and the Detailed Description, which follow, more particularly exemplify illustrative embodiments.

BRIEF DESCRIPTION OF DRAWINGS

The disclosure may be further explained with reference to the appended Figures, wherein like structure is referred to by like numerals throughout the several views, and wherein.

While the above-identified figures set forth various embodiments of the disclosed subject matter, other embodiments are also contemplated. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

The present disclosure provides a respiratory protection device including a mask body defining a breathable air zone for a wearer and having a front cover, an exhale valve in fluid communication with the breathable air zone, and a seal check mechanism disposed in the front cover. In a closed position, the seal check mechanism prevents fluid flow through the exhale valve. Exhalation by a wearer results in a positive internal pressure within the mask if the respiratory protection device is appropriately fitted and an adequate seal is achieved.

Figure 1:
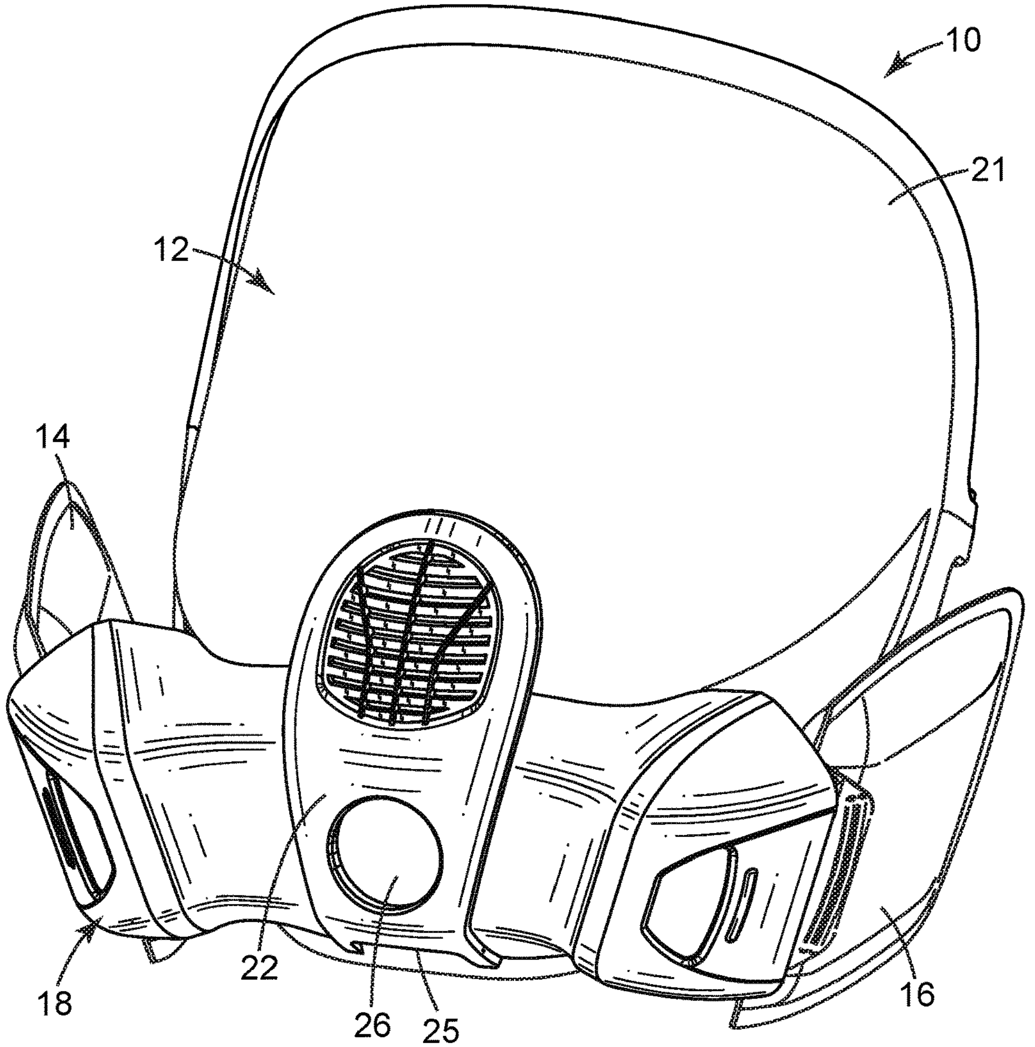
FIG. 1 is a front perspective view of an exemplary respiratory protection device according to the present disclosure.

FIG. 1 illustrate an exemplary respiratory protection device 10 that may cover the full face of a wearer and provide breathable air thereto. The respiratory protection device 10 includes a mask body 18 including one or more inlet ports (not shown). One or more breathing air source components may be positioned at the one or more inlet ports of mask body 18. In an exemplary embodiment, first and second breathing air source components 14, 16 are provided and include filter cartridges configured to be attached at first and second inlet ports. Filter cartridges 14, 16 filter air received from the external environment before the air passes into interior space within the mask body for delivery to a wearer.

The respiratory protection device 10 may include a rigid or semi-rigid portion 21 and a compliant face contacting portion (not shown). The compliant face contacting portion of the respiratory protection device 10 is compliantly fashioned for allowing the mask body to be comfortably supported over a person's face and/or for providing an adequate seal with the face of a wearer to limit undesirable ingress of air into an interior of mask body 18, for example. The compliant face contacting member may have an inturned cuff so that the mask can fit comfortably and snugly around the wearer's face. The rigid or semi-rigid portion 21 provides structural integrity to mask body 18 so that it can properly support breathing air source components, such as filter cartridges 14, 16, for example. In various exemplary embodiments, mask body portions (including 21) may be provided integrally or as separately formed portions that are subsequently joined together in permanent or removable fashion.

An exhalation port 25 allows air to be purged from an interior space within the mask body during exhalation by a wearer. In an exemplary embodiment, exhalation port 25 is located centrally on mask body 18. An exhale valve is in fluid communication with the exhalation port 25 to allow air to exit due to positive pressure created within mask body 18 upon exhalation, but prevent ingress of external air. In some exemplary embodiments, exhalation port 25 is positioned at a lower position on mask body 18, for example below the nose and mouth of a wearer.

A harness or other support (not shown) may be provided to support the mask in position about the face of a wearer. In an exemplary embodiment, a harness is provided that includes one or more straps that pass behind a wearer's head. In some embodiments, straps may be attached to a crown member supported on a wearer's head, a suspension for a hard hat, or another head covering.

Figure 2:
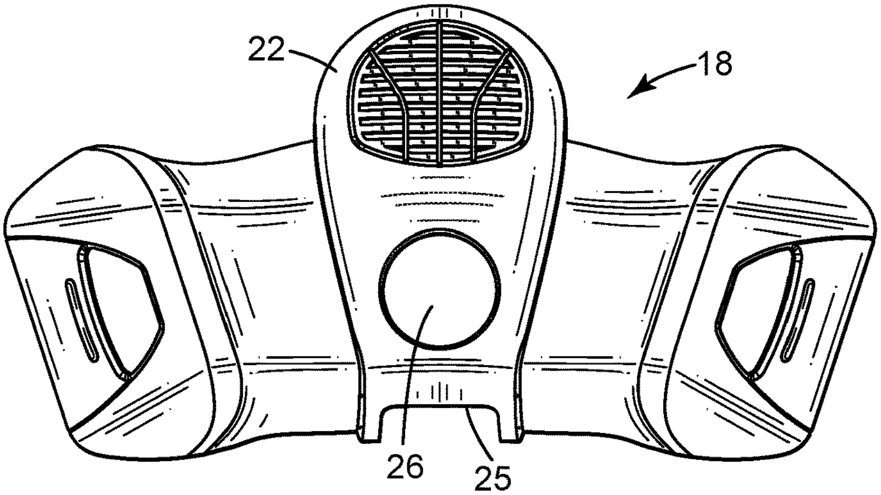
FIG. 2 is a front perspective view of an exemplary front cover of the presently disclosed respiratory protection device.

The one or more inlet ports of mask body 18 are configured to receive one or more breathing air source components 14, 16. In an exemplary embodiment including two or more breathing air source components 14, 16, as shown in FIGS. 1 and 2, mask body 18 includes first and second inlet ports (not shown) on either side of mask body 18, and may be proximate cheek portions of mask body 18. First and second inlet ports include complementary mating features (not shown) such that first and second breathing air source components 14, 16 may be securely attached to mask body 18. Other suitable connections may be provided as known in the art. The mating features may result in a removable connection such that the breathing air source components 14, 16 may be removed and replaced at the end of service life of the breathing air source component or if use of a different breathing air source component is desired. Alternatively, the connection may be permanent such that the breathing air source components cannot be removed without damage to the breathing air source component, for example.

Figure 3:
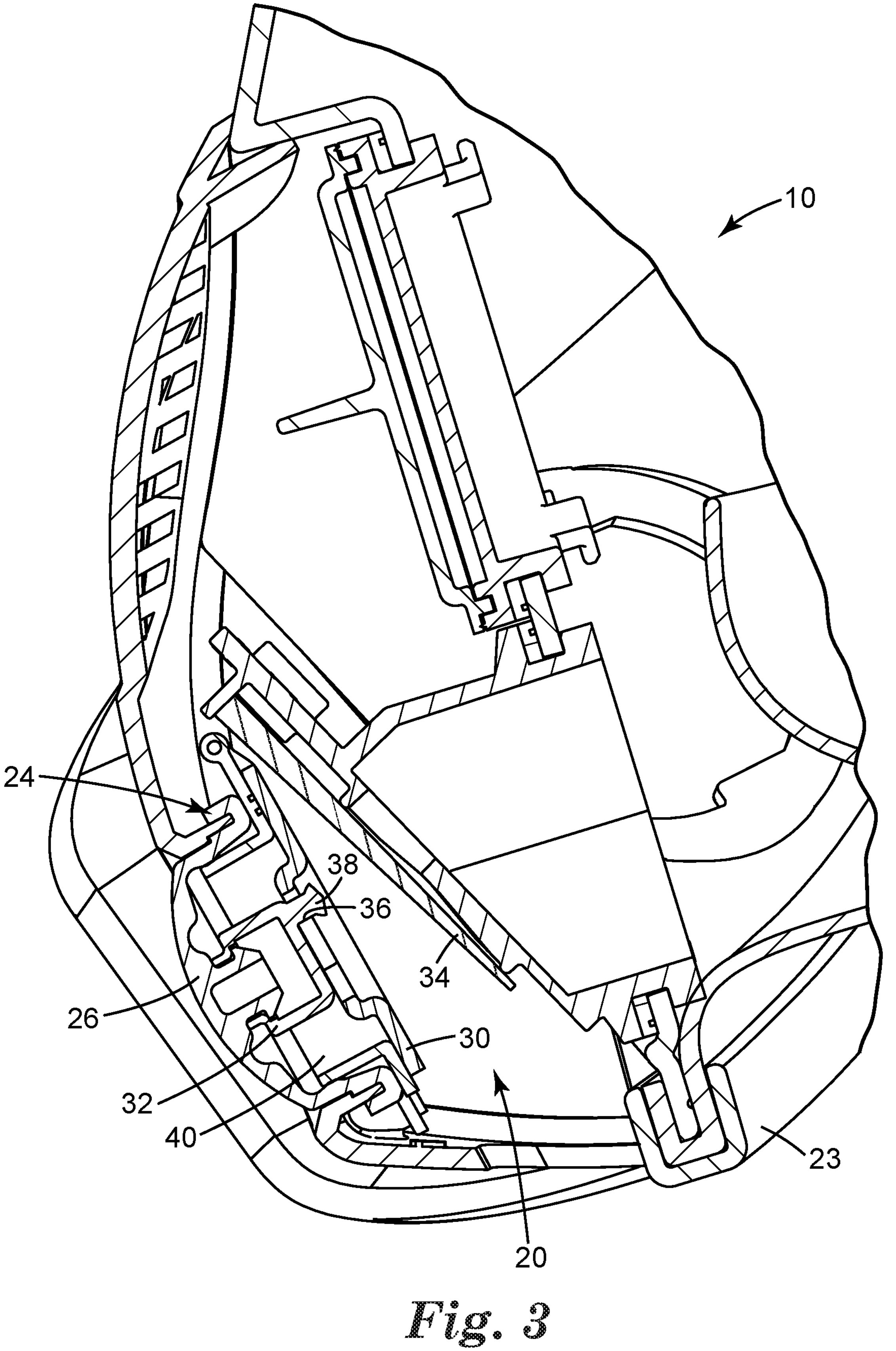
FIG. 3 is a partial cross-section view of an exemplary seal check mechanism according to the present disclosure showing a seal check mechanism in an open position.
Figure 4:
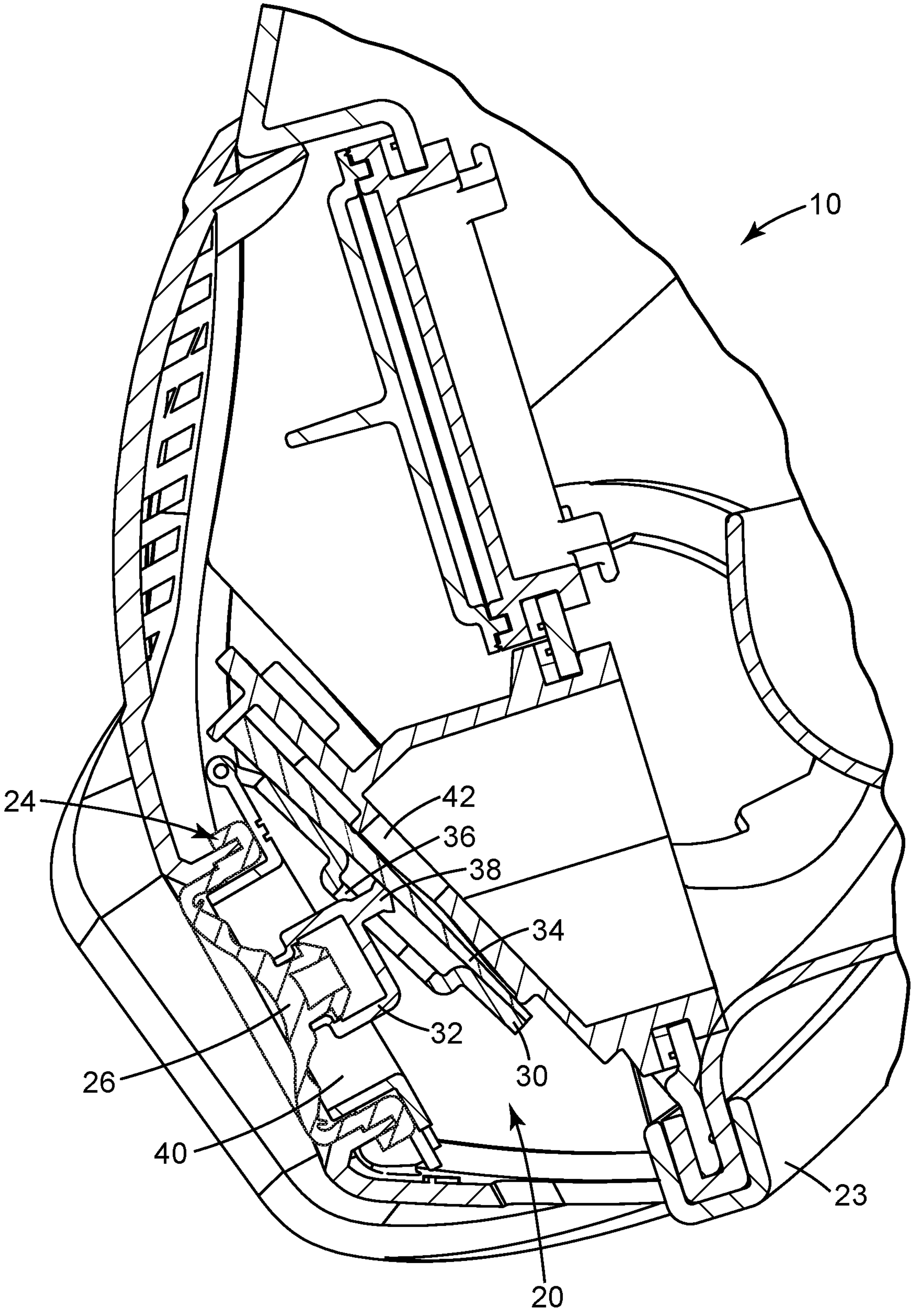
FIG. 4 is a partial cross-section view of an exemplary seal check mechanism according to the present disclosure showing a seal check mechanism in a closed position.

Referring now to FIGS. 3 and 4, the presently disclosed respiratory protection device 10 includes a seal check mechanism 24 for closing an exhale valve 34. In an exemplary embodiment, seal check mechanism 24 is operable between a closed position and an open position. In a closed position, seal check mechanism 24 prevents fluid communication between a breathable air zone 20 within the respiratory protection device 10 and an exhalation port 25 of the front cover 22 of the mask body 18.

Seal check mechanism 24 allows a wearer to perform a positive pressure fit check to provide an indication of the presence of leaks around a periphery of the respiratory protection device 10. When seal check mechanism 24 is in a closed position, air is prevented from exiting a breathable air zone 20 of respiratory protection device 10. Exhalation by a wearer while the seal check mechanism 24 is in a closed position will result in a positive pressure within the mask, and in an exemplary embodiment may cause a compliant face contacting member to deflect outward, if an adequate seal has not been achieved between the respiratory protection device 10 and the wearer's face. If an adequate seal is achieved, a wearer will find greater difficulty in exhaling into the breathable air zone between the periphery of the respiratory protection device 10 and the face of the wearer. In this way, a positive pressure fit check can be easily performed by a wearer wearing respiratory protection device 10 to determine if an adequate seal is achieved between the respiratory protection device 10 and the face and/or head of the wearer.

In some embodiments, the respiratory protection device 10 includes a seal check mechanism 24 having button 26 with a plane that is different than a plane of the exhale valve 34. In some embodiments, the respiratory protection device 10 includes a seal check mechanism 24 having button 26 with a plane that intersects a plane of the exhale valve 34.

In some embodiments, the presently disclosed respiratory protection device also has a plunger 32, where the plunger 32 has a connecting member 38 configured to movably connect the plunger 32 to the flap 30. In some embodiments, the flap 30 is configured to receive the connecting member 38. The connecting member can have various shapes provided that they can be received by a connecting opening 36 in the flap 30. Exemplary embodiments of the connecting member 38 include mushroom head shape, key shape, or any other shape in which a portion of the connecting member 38 that protrudes through the flap 30 is larger in shape that the size of the connecting opening 36. Because of this configuration, the connecting member 38 is configured to push and pull the flap 30 depending on whether or not the button 26 is actuated. In some embodiments, the presently disclosed respiratory protection device 10 includes a button 26 that is a monolithic part with the plunger 32.

In some the button 26 comprises a flexible material configured to bias the seal check mechanism 24 in an open position. The flexible material comprises an elastomer. For example, silicone based elastomers may be used in the presently disclosed buttons 26.

In some embodiments, the presently disclosed respiratory protection device 10 also includes a retainer 40 operably disposed between the button 26 and the flap 30. For example, the retainer 40 may mounted on or integrally formed in the mask body 18 or front cover 22 of the respiratory protection device 10. In some embodiments, the retainer 40 includes an opening that receives a pin integrally formed on an interior surface of the presently disclosed respiratory protection device 10.

In some embodiments, the retainer 40 and exhale valve 34 valve are pivotably connected to one another. In some embodiments, the flap 30 pivots between an open position and a closed position. For example, when a wearer actuates the button 26, the connecting member 38 on the plunger 32 engages the connecting opening 36 on the flap 30, thereby contacting the flap 30 with the exhale valve 34 and biasing the exhale valve 34 in a closed position. In some embodiments, the presently disclosed flap 30 includes a sealing pad that may be formed of a soft or resilient material such that sealing pad may flex upon contacting a sealing surface in the exhale valve. In an exemplary embodiment, the sealing pad includes seating features, such as angled or flanged lips (not shown), to facilitate an adequate seal with sealing surface. All or a portion of the sealing pad may also articulate or rotate when contacting the sealing surface. A sealing pad that may flex and/or articulate or rotate may facilitate formation of an adequate seal within the exhale valve 34.

In some embodiments, the presently disclosed respiratory protection device 10 includes a seal check mechanism 24 in which all components, other than the button 26, comprise rigid materials. This combination of flexible materials and rigid materials allows the presently disclosed seal check mechanism 24 to close, or seal, the exhale valve 34 even with a motion that is non-linear to the motion required to close or seal the exhale valve 34. This results in more variety and options in how the wearer can actuate the button 26 to close, or seal, the exhale valve 34. For example, in some embodiments, a rotatable actuator is believed to provide several advantages including ease of use and less effect on the fit of a respiratory protection device during performance of a positive pressure fit check. Rotation of a rotatable actuator does not require force in a direction towards the face of a wearer and thus may not alter the natural contact between a respiratory protection device and a wearer's face. Accordingly, an accurate positive pressure fit check may be achieved.

A respiratory protection device according to the present disclosure provides several advantages. A seal check mechanism operable between a closed position and an open position allows a wearer to easily perform a positive pressure fit test. A respiratory protection device according to the present disclosure thus may provide a solution to closing an exhale valve that was inaccessible and not easily closed in many prior devices, for example. Respiratory protection devices as described above allow a positive pressure fit test to be performed by closing a single valve even if the mask may include more than one breathing air source components or more inlet or exhalation port, and does not require a wearer to engage multiple actuators or perform individual tests for each point of ingress of egress to the respiratory protection device, for example. A seal check mechanism as described herein may be suitable for half-face respirators, full-face respirators, powered or positive pressure respirators, and other suitable respiratory protection devices.

Following are exemplary embodiments and combinations of embodiments.

Embodiment 1. A respiratory protection device, comprising: a mask body defining a breathable air zone for a wearer and having a front cover; an exhale valve in fluid communication with the breathable air zone; and a seal check mechanism disposed in the front cover, wherein the seal check mechanism comprises a button associated with a flap such that, when actuated, the flap biases the exhale valve in a closed position, and wherein a plane of the button intersects with a plane of the exhale valve.

Embodiment 2. The respiratory protection device of Embodiment 1, further comprising a plunger, wherein the plunger has a connecting member configured to movably connect the plunger to the flap.

Embodiment 3. The respiratory protection device of Embodiment 2 wherein the flap is configured to receive the connecting member.

Embodiment 4. The respiratory protection device of any of the preceding Embodiments, wherein the button comprises a flexible material configured to bias the seal check mechanism in an open position.

Embodiment 5. The respiratory protection device of Embodiment 4, wherein the flexible material comprises an elastomer.

Embodiment 6. The respirator protection device of any of the preceding Embodiments, further comprising a retainer operably disposed between the button and the flap.

Embodiment 7. The respirator protection device of Embodiment 6, wherein the retainer and exhale valve are pivotably connected.

Embodiment 8. The respirator protection device of any of the preceding Embodiments, wherein the button and the plunger are a monolithic part.

Embodiment 9. The respiratory protection device of any of the preceding Embodiments, wherein exhalation by a wearer while the seal check mechanism is in a closed position provides an indication of the presence of leaks around a periphery of the mask body.

Embodiment 10. The respiratory protection device of Embodiment 9, wherein the indication is the wearer's ability to exhale.

Embodiment 11. The respiratory protection device of any of the preceding Embodiments, wherein when the mask body is positioned for use on a wearer, a positive pressure is achieved by closing the exhale valve and exhaling.

Embodiment 12. The respiratory protection device of any of the preceding Embodiments, wherein the seal check mechanism returns to an open position when the wearer stops actuating the button.

Embodiment 13. The respiratory protection device of any of the preceding Embodiments, wherein the flap pivots between an open position and a closed position.

Embodiment 14. The respiratory protection device mask of any of the preceding Embodiments, wherein components used in the seal check mechanism other than the button comprise rigid materials.

Embodiment 15. A respiratory protection device, comprising: a mask body defining a breathable air zone for a wearer and having a front cover; an exhale valve in fluid communication with the breathable air zone; and a seal check mechanism disposed in the front cover, wherein the seal check mechanism comprises a button flexibly attached to a flap, and wherein when the button is actuated, the flap biases the exhale valve in a closed position, and further wherein the button and the plunger are a monolithic part.

Embodiment 16. The respiratory protection device of Embodiment 15, further comprising a plunger, wherein the plunger has a connecting member configured to movably connect the plunger to the flap.

Embodiment 17. The respiratory protection device of Embodiment 16 wherein the flap is configured to receive the connecting member.

Embodiment 18. The respiratory protection device of any Embodiments 15 to 17, wherein the button comprises a flexible material configured to bias the seal check mechanism in an open position.

Embodiment 19. The respiratory protection device of Embodiment 18, wherein the flexible material comprises an elastomer.

Embodiment 20. The respirator protection device of any of Embodiments 15 to 19, further comprising a retainer operably disposed between the button and the flap.

Embodiment 21. The respirator protection device of Embodiment 20, wherein the retainer and exhale valve are pivotably connected.

Embodiment 22. The respirator protection device of any of Embodiments 15 to 21, wherein a plane of the exhale valve is different than a plane of the button.

Embodiment 23. The respirator protection device of Embodiment 22, wherein the plane of the exhale valve intersects the plane of the button.

Embodiment 24. The respiratory protection device of any of Embodiments 15 to 23, wherein exhalation by a wearer while the seal check mechanism is in a closed position provides an indication of the presence of leaks around a periphery of the mask body.

Embodiment 25. The respiratory protection device of Embodiment 24, wherein the indication is the wearer's ability to exhale.

Embodiment 26. The respiratory protection device of any of Embodiments 15 to 25, wherein when the mask body is positioned for use on a wearer, a positive pressure is achieved by closing the exhale valve and exhaling.

Embodiment 27. The respiratory protection device of any of Embodiments 15 to 26, wherein the seal check mechanism returns to an open position when the wearer stops actuating the button.

Embodiment 28. The respiratory protection device of any of Embodiments 15 to 27, wherein the flap pivots between an open position and a closed position.

Embodiment 29. The respirator protection device of any of Embodiments 15 to 28, wherein components used in the seal check mechanism other than the button comprise rigid materials.

The foregoing detailed description and examples have been given for clarity of understanding only. No unnecessary limitations are to be understood there from. It will be apparent to those skilled in the art that many changes can be made in the embodiments described without departing from the scope of the disclosure. Any feature or characteristic described with respect to any of the above embodiments can be incorporated individually or in combination with any other feature or characteristic, and are presented in the above order and combinations for clarity only. Thus, the scope of the present disclosure should not be limited to the exact details and structures described herein, but rather by the structures described by the language of the claims, and the equivalents of those structures.

What is claimed is:

1. A respiratory protection device, comprising:

a mask body defining a breathable air zone for a wearer and having a front cover;

an exhale valve comprising a first plane and a second plane wherein the first plane is in fluid communication with the breathable air zone and the second plane is in fluid communication with the filtered air inside the mask body; and a seal check mechanism disposed in the front cover, wherein the seal check mechanism comprises a button associated with a flap such that, when the button is actuated, the flap biases parallel to the first plane of the exhale valve in a closed position, and wherein a plane of the button intersects with the first plane of the exhale valve.

2. The respiratory protection device of claim 1, wherein the seal check mechanism further comprises a plunger, wherein the plunger has a connecting member configured to movably connect the plunger to the flap.

3. The respiratory protection device of claim 2 wherein the flap is configured to receive the connecting member.

4. The respiratory protection device of claim 1, wherein the button comprises a flexible material configured to bias the seal check mechanism in an open position.

5. The respiratory protection device mask of claim 1, wherein the seal check mechanism other than the button comprise rigid materials.

6. The respirator protection device of claim 1, wherein the seal check mechanism further comprises a retainer operably disposed between the button and the flap.

7. The respirator protection device of claim 6, wherein the retainer and exhale valve are pivotably connected.

8. The respirator protection device of claim 1, wherein the button and the plunger are a monolithic part.

9. The respiratory protection device of claim 1, wherein exhalation by the wearer while the seal check mechanism is in a closed position provides an indication of the presence of leaks around a periphery of the mask body.

10. The respiratory protection device of claim 9, wherein the indication is the wearer's ability to exhale.

11. The respiratory protection device of claim 1, wherein when the mask body is positioned for use on the wearer, a positive pressure is achieved by closing the exhale valve and exhaling.

12. The respiratory protection device of claim 1, wherein the seal check mechanism returns to an open position when the wearer stops actuating the button.

13. The respiratory protection device of claim 1, wherein the flap pivots between an open position and a closed position.

14. A respiratory protection device, comprising:

a mask body defining a breathable air zone for a wearer and having a front cover;

an exhale valve in fluid communication with the breathable air zone; and a seal check mechanism disposed in the front cover, wherein the seal check mechanism comprises a button associated with a flap such that, when actuated, the flap biases the exhale valve in a closed position, and wherein a plane of the button intersects with a plane of the exhale valve wherein the button comprises a flexible material configured to bias the seal check mechanism in an open position, and wherein the flexible material comprises an elastomer.

15. A respiratory protection device, comprising:

a mask body defining a breathable air zone for a wearer and having a front cover;

an exhale valve comprising a first plane and a second plane wherein the first plane is in fluid communication with the breathable air zone; and a seal check mechanism disposed in the front cover, wherein the seal check mechanism comprises a plunger and a button flexibly attached to a flap, and wherein when the button is actuated, the flap biases parallel to the first plane of the exhale valve in a closed position, and further wherein the button and the plunger are a monolithic part.

16. The respiratory protection device of claim 15, wherein the plunger has a connecting member configured to movably connect the plunger to the flap.

17. The respiratory protection device of claim 16 wherein the flap is configured to receive the connecting member.

18. The respiratory protection device of claim 17, wherein the button comprises a flexible material configured to bias the seal check mechanism in an open position.

19. A respiratory protection device, comprising:

a mask body defining a breathable air zone for a wearer and having a front cover;

an exhale valve in fluid communication with the breathable air zone; and a seal check mechanism disposed in the front cover, wherein the seal check mechanism comprises a plunger and a button flexibly attached to a flap, wherein when the button is actuated, the flap biases the exhale valve in a closed position, wherein the button and the plunger are a monolithic part, wherein the plunger has a connecting member configured to movably connect the plunger to the flap, wherein the flap is configured to receive the connecting member, wherein the button comprises a flexible material configured to bias the seal check mechanism in an open position, and wherein the flexible material comprises an elastomer.

* * * * *